United States Patent [19]
McDonald

[11] Patent Number: 5,249,188
[45] Date of Patent: Sep. 28, 1993

[54] SYNCHRONIZING TWO PROCESSORS AS AN INTEGRAL PART OF FAULT DETECTION

[75] Inventor: Keith M. McDonald, Phoenix, Ariz.

[73] Assignee: AG Communication Systems Corporation, Phoenix, Ariz.

[21] Appl. No.: 749,834

[22] Filed: Aug. 26, 1991

[51] Int. Cl.⁵ .............................................. G06F 15/40
[52] U.S. Cl. .................................. 371/68.3; 364/132; 371/67.1
[58] Field of Search .................... 371/68.3, 68.2, 68.1, 371/9.1, 61, 16.3, 47.1, 29.5, 15.1, 67.1, 7.1, 42; 379/32; 364/200 MS File, 900 MS File

[56] References Cited

U.S. PATENT DOCUMENTS

| | | | |
|---|---|---|---|
| 4,358,823 | 11/1982 | McDonald et al. | 364/200 |
| 4,633,039 | 12/1986 | Holden | 379/32 |
| 4,817,094 | 3/1989 | Lebizay et al. | 371/68.2 |
| 4,878,049 | 10/1989 | Ochiai et al. | 371/5.5 |
| 4,975,838 | 12/1990 | Mizuno et al. | 364/200 |
| 5,161,151 | 11/1992 | Kimura et al. | 370/13 |

*Primary Examiner*—Robert W. Beausoliel, Jr.
*Assistant Examiner*—Phung Chung
*Attorney, Agent, or Firm*—Anthony J. Baca

[57] ABSTRACT

A central processing unit arrangement for detecting a fault in a central processing unit system that includes a master processor and a slave processor. Master and slave processors are resynchronized at every bus cycle by conditioning the processors' READY signal with the ADS (address status) signals from each processor (ADS indicates that an access cycle has begun and a valid address is present on the address bus). This method of synchronization was selected over the more traditional method of lock-step, which was deemed impractical to implement given the timing constraints of a high speed bus. Also, the dual processors may not always begin their respective bus cycles on the same clock. In addition, it is necessary to synchronize processors for the first instruction fetch following a reset, because the time of completion of an internal self-test may not be deterministic. After both ADS signals are received, the status of the master and slave buses are compared and a fault is detected if the buses are different. If a predetermined amount of time passes before both ADS signals are received then the processors are signaled to continue with the cycle. Because the processors are no longer synchronized, the buses will miscompare, thereby detecting a fault. Additional fault detection measures can be taken such as parity, checksum and EDAC.

5 Claims, 3 Drawing Sheets

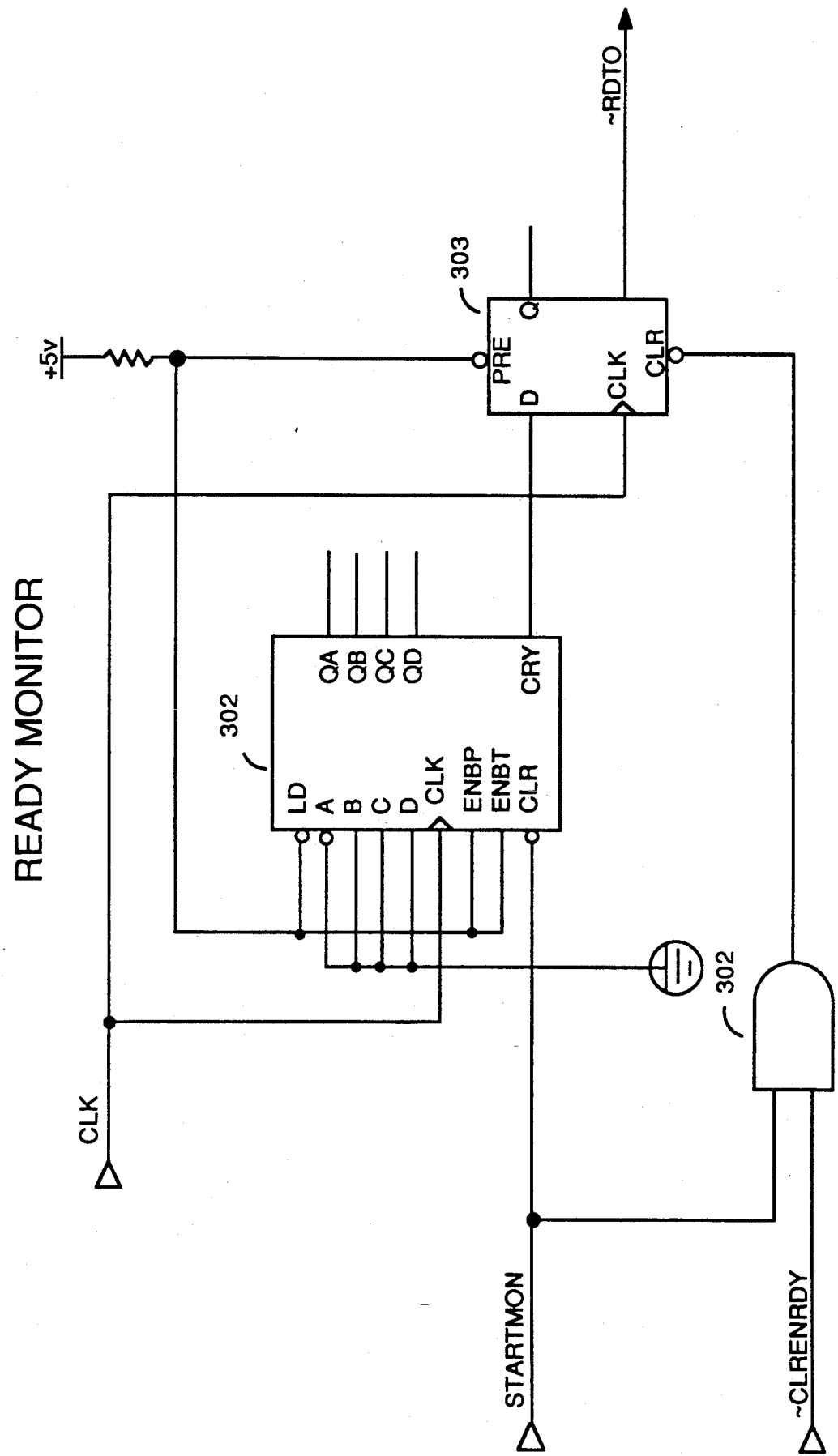

SYNCHRONIZING TWO PROCESSORS AS AN INTEGRAL PART OF FAULT DETECTION

FIELD OF THE INVENTION

The present invention relates in general to computing systems, and more particularly, fault detection of a processor system through the use of a master-slave arrangement.

BACKGROUND OF THE INVENTION

Fault-tolerant computer systems have used several arrangements to detect and/or correct hardware faults. Some of these methods include: parity on the bus system; EDAC (error detection and correction) for memory; and, redundant systems, to name a few. The area of redundant systems uses two primary methods, they are N+1 and "Hot" standby. Both types require switching a backup system on-line when a fault in the primary system is detected. However, detecting a fault may be difficult.

Limiting the scope to the CPU (central processor unit), detecting a fault requires a comparison between a known value and an unknown value. For the CPU peripherals, parity, or a derivative, can be used to detect most errors. However, detecting faults in a processor CPU is not that simple. Using two processors synchronized with each other and comparing their signals for any differences is the most common method to detect faults. If a difference is found in the comparison the CPU system is taken off-line and diagnostic software is used to help isolate the fault.

In prior systems the basic assumption for "microsynched" processor systems was that if the two CPUs started simultaneously and used the same input stimulus, they would always execute in lock-step absent a fault. (Examples of such prior art can be seen in U.S. Pat. Nos. 4,412,282 and 4,633,039, both assigned to the same assignee as the present invention.) This required that both processors receive the same input signals such as CLOCK, RESET, and INTERRUPTS; as a result, the output of the two processor would be identical, within timing specifications. This assumption may not be valid for today's complex processors. Therefore, simply providing the same stimulus may not insure concurrent operation of the two processors.

It is therefore a primary objective to provide a means of synchronizing two or more processors and thereby allowing detection of faults in a processor CPU system.

SUMMARY OF THE INVENTION

In order to accomplish the object of the present invention there is provided a central processing unit fault detection arrangement for detecting a fault in a central processing unit system. The central processing unit fault detection arrangement includes a master processor that provides a first address bus, a first data bus and a first address stable signal. The first address stable signal is active when the first address bus is stable. The master processor also receives a master ready signal. After the master processor generates the address stable signal the master processor waits until the master ready signal is received.

The master processor is complemented by a slave processor that provides a second address bus, a second data bus and a second address stable signal. The second address stable signal is active when the second address bus is stable. The slave processor also receives a slave ready signal. After the slave processor generates the address stable signal the slave processor waits until the slave ready signal is received.

The address stable from both the master and slave processors are sent to a ready synchronizer. Subsequent to receiving both the first address stable signal and the second address stable signal the ready synchronizer generates a synchronized ready signal. The synchronized ready signal is transmitted to the master processor and the slave processor as the master ready signal and the slave ready signal respectively.

Finally a comparator receives the address buses and data buses from both master and slave processors, and the synchronized ready signal. The comparator compares the address buses and first data buses when the synchronized ready signal is active. The comparator generates an alarm signal when either bus contains different values, thereby detecting the fault in the central processing unit system.

DESCRIPTION OF THE DRAWINGS

A better understanding of the invention may be had from the consideration of the following detailed description taken in conjunction with the accompanying drawings, in which:

FIG. 3 is a detailed diagram of the READY MONITOR circuit.

DESCRIPTION OF THE PREFERRED EMBODIMENT

Figure 1:
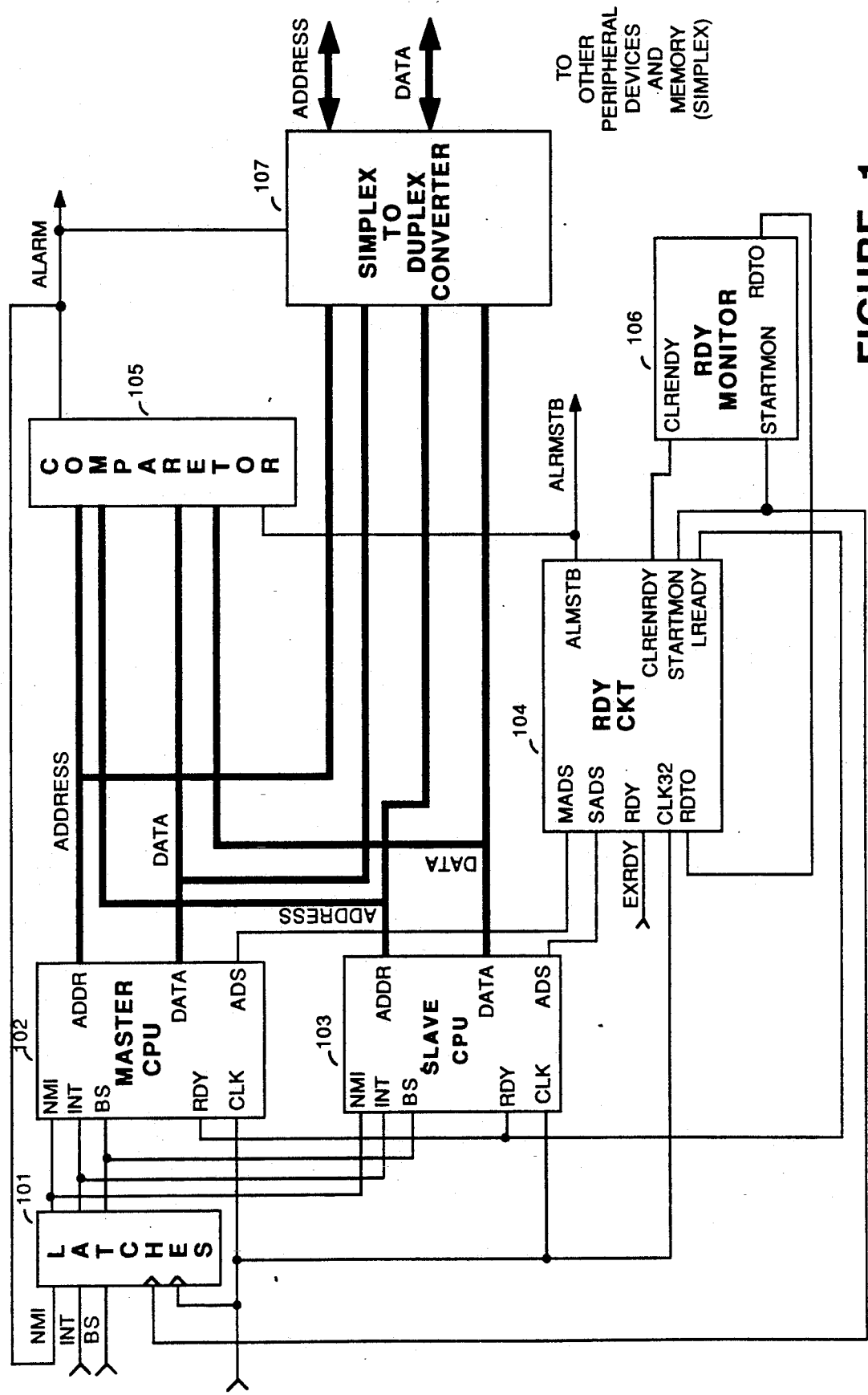
FIG. 1 is a block diagram of the present invention.

Referring first to FIG. 1. The master and slave processors 102 and 103 are resynchronized at every bus cycle by conditioning the processors' READY signal with the ADS (address status) signals from each processor (ADS indicates that an access cycle has begun and a valid address is present on the address bus). This method of synchronization was selected over the more traditional method of lock-step, which was deemed impractical to implement given the timing constraints of a high speed bus. Also, the dual processors may not always begin their respective bus cycles on the same clock. In addition, it is necessary to synchronize processors for the first instruction fetch following a reset, because the time of completion of internal self-test may not be deterministic. It should be noted that the RDY synchronization unfortunately exacts a toll of 1 T-state from the dual processor system.

Figure 2:
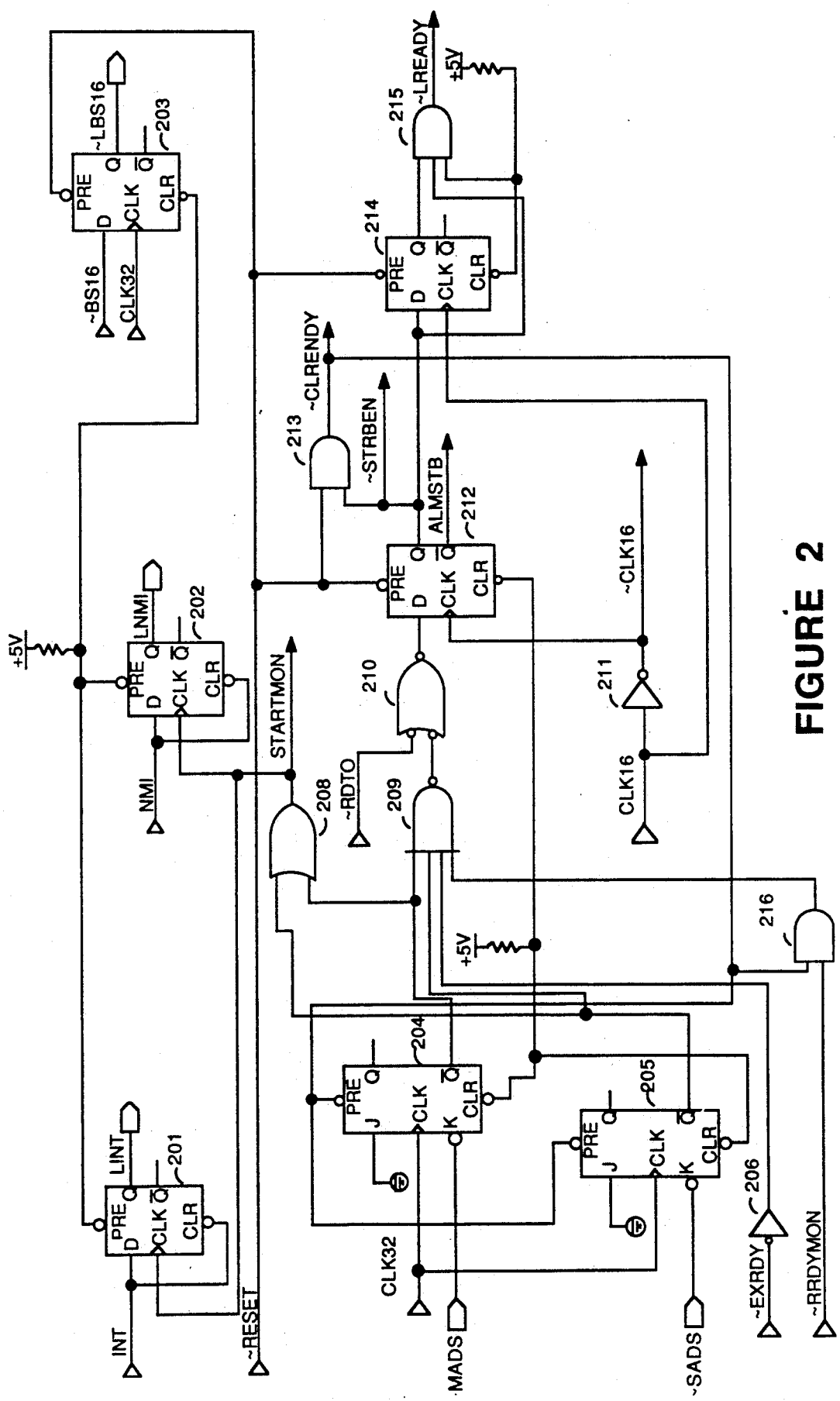
FIG. 2 is a detailed diagram of the READY synchronization circuit.

The READY signal from each processor is conditioned, synchronized and combined with an external ready signal (EXRDY) by the RDY circuit 104 (see FIG. 2 for more detail). The outputs of 104 are used to control a RDY monitor 106, an array of comparators 105, and various bus control logic not shown in FIG. 1. The bus control logic might include bus transceivers, bus drivers, parity generators/detectors and similar devices.

Comparators 105 compare all signals of the MASTER processor 102 with those of the SLAVE processor 103. However, this comparison is only done after the RDY circuit 104 has received both ADS signals from the processors and approximately one clock cycle before RDY is returned to the processors (i.e., when the signal ALRMSTB is active). The RDY circuit 104 includes a TEST input to aid in determining if the fault detection circuitry (104-106) is functioning properly. Simplex to duplex converter 107 provides the interface to the remaining simplex system and includes such things as transceivers, buffers, parity checkers/generators, and bus state latches.

The RDY monitor 106 (see FIG. 3 for more detail) monitors the RDY output of RDY circuit 104 for activity. Should there be no activity for a predetermine amount of time, then the RDY monitor will "time-out." If the RDY monitor 106 does "time-out," the RDY circuit 104 is signalled to generate the RDY output signal. As a result of this forced RDY generation, the COMPARATOR 105 will signal a miscompare thereby latching the bus state condition and generating an NMI (non-maskable interrupt) to the processors. This process can be simulated by asserting TEST to the active state.

Referring next to FIG. 2 where a detailed schematic of the RDY circuit (104 from FIG. 1) is shown. Signals -MADS and -SADS (ADS from master and slave processor, respectively) must be latched into respective JK Flip-Flops (JKFF) 204, 205 and OR'ed with -EXRDY (external ready) signal before RDY is propagated to the synchronizing D-Flip-Flops (D-FF) 212 and 214. When -MADS or -SADS is latched, STARTMON (start ready monitor) from gate 208 is asserted, enabling the ready monitor counter. If both processors have begun access cycles, and -EXRDY is asserted prior to a potential ready monitor time-out, RDY is synchronized by the D-FFs 212 and 214. This asserts -LREADY (Latched ready) from gate 215 to both processors within valid setup-and-hold times, allowing the processors to complete the bus cycle. Signal -LREADY is also propagated to the local bus control logic where it is used as a state input to a bus controller PAL. In addition, latching RDY asserts ALMSTB (alarm strobe) from D-FF 212 that clocks the PFAIL latches (the comparator 105 from FIG. 1) and causes parity to be sampled by the parity error detection logic (part of simplex to duplex circuitry 107 of FIG. 1). Active -LREADY also asserts -CLRENRDY (clear enable RDY) that clears the MADS and SADS latches 204 and 205, preparing for the start of the next cycle. Clearing the MADS and SADS latches also resets the ready monitor counter by forcing STARTMON low. Active -CLRENRDY also clears the ready monitor time-out latch that could potentially have been set by a ready monitor time-out, and causes the RDY synchronization latch D-FF 214 to be synchronously cleared in preparation for the next bus cycle.

If an access cycle by only one processor occurs, or if -EXRDY is not returned during an access cycle, the ready monitor (106 of FIG. 1) will time out forcing the RDY latch 212 and the RDY synchronizer 214 to assert -LREADY, thereby terminating the extended bus cycle and latching pertinent alarms.

Signal -RRDYMON (routine ready monitor) is asserted by setting the appropriate bit in a maintenance control register. This signal disables RDY from propagating to the RDY latch, thereby allowing the ready monitor to time out for any access cycle as long as -RRDYMON is active.

Next referring to FIG. 3, the RDY monitor circuit (106 of FIG. 1). As the schematic shows, the RDY monitor is a simple eight-bit counter 301 with a D-FF 303 used to latch the carry signal.

Although the preferred embodiment of the invention has been illustrated, and that form described, it is readily apparent to those skilled in the art that various modifications may be made therein without departing from the spirit of the invention or from the scope of the appended claims.

What is claimed is:

1. A central processor unit including a fault detector means for detecting a fault in said central processor unit, said central processor unit comprising:
   a master processor means for providing a first address bus, a first data bus and a first address stable signal, said first address stable signal being active when said first address bus is stable, after said master processor means generates said first address stable signal said master processor means waits until a master ready signal is received;
   a slave processor mean for providing a second address bus, a second data bus and a second address stable signal, said second address stable signal being active when said second address bus is stable, after said slave processor means generates said second address stable signal said slave processor means waits until a slave ready signal is received;
   a ready synchronizer means for receiving said first address stable signal from said master processor means and said second address stable signal from said slave processor means, subsequent to receiving both said first address stable signal and said second address stable signal said ready synchronizer means generates a synchronized ready signal, said synchronized ready signal being transmitted to said master processor means and said slave processor means, said master processor means receiving said synchronized ready signal as said master ready signal and said slave processor means receiving said synchronized ready signal as said slave ready signal; and
   a comparator means for receiving said first address bus, said first data bus, said second address bus, said second data bus and said synchronized ready signal, said comparator means compares said first address bus with said second address bus, and, said first data bus with said second data bus when said synchronized ready signal is received, said comparator means generates an alarm signal when said first address bus and said second address bus are different, said comparator means generates said alarm signal when said first data bus and said second data bus are different, said fault being detected in said central processor unit when said alarm signal is generated.

2. A central processor unit as claimed in claim 1 further comprising a ready monitor means for receiving said synchronized ready from said ready synchronizer means, said ready monitor means signals said ready synchronizer means to generate said synchronized ready if a predetermined amount of time has elapsed prior to receiving said synchronized ready.

3. A central processor unit including a fault detector means for detecting a fault in said central processor unit, said central processor unit comprising:
   a master processor means for providing a first bus and a first stable signal, said first stable signal being active when said first bus is stable, after said master processor means generates said first stable signal said master processor means waits until a master ready signal is received;
   a slave processor means for providing a second bus and a second stable signal, said second stable signal being active when said second bus is stable, after said slave processor means generates said second stable signal said slave processor means waits until a slave ready signal is received;
- a ready synchronizer means for receiving said first stable signal from said master processor means and said second stable signal from said slave processor means, subsequent to receiving both said first stable signal and said second stable signal said ready synchronizer means generates a synchronized ready signal, said synchronized ready signal being transmitted to said master processor means and said slave processor means, said master processor means receiving said synchronized ready signal as said master ready signal and said slave processor means receiving said synchronized ready signal as said slave ready signal; and
- a comparator means for receiving said first bus, said second bus and said synchronized ready signal, said comparator means compares said first bus with said second bus when said synchronized ready signal is received, said comparator means generates an alarm signal when said first bus and said second bus are different, said fault being detected in said central processor unit when said alarm signal is generated.

4. A central processor unit as claimed in claim 3 further comprising a ready monitor means for receiving said synchronized ready from said ready synchronizer means, said ready monitor means signals said ready synchronizer means to generate said synchronized ready if a predetermined amount of time has elapsed prior to receiving said synchronized ready.

5. A central processor unit including a fault detector means for detecting a fault in said central processor unit, said central processor unit comprising:
- a master processor means for providing a first bus and a first stable signal, said first stable signal being active when said first bus is stable, after said master processor means generates said first stable signal said maser processor means waits until a master ready signal is received;
- a slave processor means for providing a second bus and a second stable signal. said second stable signal being active when said second bus is stable, after said slave processor means generates said stable signal said slave processor means waits until a slave ready signal is received;
- a ready synchronizer means for receiving said first stable signal from said master processor means and said second stable signal from said slave processor means, subsequent to receiving both said first stable signal and said second stable signal said ready synchronizer means generates a synchronized ready signal, said synchronized ready signal being transmitted to said master processor means and said slave processor means, said master processor means receiving said synchronized ready signal as said master ready signal and said slave processor means receiving said synchronized ready signal as said slave ready signal;
- a ready monitor means for receiving said synchronized ready from said ready synchronizer means, said ready monitor means signals said ready synchronizer means to generate said synchronized ready if a predetermined amount of time has elapsed prior to receiving said synchronized ready; and
- comparator means for receiving said first bus, said second bus and said synchronized ready signal, said comparator means compares said first bus with said second bus when said synchronized ready signal is received, said comparator means generates an alarm signal when said first bus and said second bus are different, said fault being detected in said central processor unit when said alarm signal is generated.

* * * * *